(12) United States Patent
Zlatintsis

(10) Patent No.: US 10,962,120 B2
(45) Date of Patent: Mar. 30, 2021

(54) VALVE AND USE THEREOF IN A FIRE-EXTINGUISHING SYSTEM

(71) Applicant: MINIMAX GMBH & CO. KG, Bad Oldesloe (DE)

(72) Inventor: Chrysafis Zlatintsis, Neumünster (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 16/482,580

(22) PCT Filed: Feb. 1, 2018

(86) PCT No.: PCT/EP2018/052577
§ 371 (c)(1),
(2) Date: Aug. 28, 2019

(87) PCT Pub. No.: WO2018/146003
PCT Pub. Date: Aug. 16, 2018

(65) Prior Publication Data
US 2019/0383401 A1  Dec. 19, 2019

(30) Foreign Application Priority Data

Feb. 8, 2017 (DE) .................... 10 2017 102 425.5

(51) Int. Cl.
*F16K 1/20* (2006.01)
*A62C 35/68* (2006.01)
*F16K 25/02* (2006.01)

(52) U.S. Cl.
CPC .............. *F16K 1/205* (2013.01); *A62C 35/68* (2013.01); *F16K 1/2007* (2013.01);
(Continued)

(58) Field of Classification Search
CPC ...... F16K 1/205; F16K 1/2085; F16K 1/2092; F16K 1/2007; F16K 1/2014; F16K 25/02; A62C 35/68
See application file for complete search history.

(56) References Cited

U.S. PATENT DOCUMENTS 1,185,041 A    5/1916  Ashey
1,664,648 A *  4/1928  Tyden ................... F16K 1/2007
                                                           137/513
(Continued)

FOREIGN PATENT DOCUMENTS

DE      12 04 902 B    11/1965
DE      28 17 355 A1   12/1978
(Continued)

OTHER PUBLICATIONS

International Searching Authority, International Search Report in German & English translation in International Appln. No. PCT/EP2018/052577, dated May 15, 2018, 7 pages.
(Continued)

*Primary Examiner* — David Colon-Morales
(74) *Attorney, Agent, or Firm* — Perkins Coie LLP

(57) ABSTRACT

A valve, having a valve housing which has a fluid inlet chamber and a fluid outlet chamber, having a valve seat which is arranged between the fluid inlet chamber and the fluid outlet chamber, and having a closure body which is movable back and forth between a release position and a blocking position. The closure body abuts against the valve seat in a fluid-tight manner in the blocking position, and wherein the fluid inlet chamber and the fluid outlet chamber are connected to one another in a fluid-conducting manner in the release position. The valve seat and the closure body each have a sealing surface, which are opposite one another in the blocking state, and an elastically deformable sealing
(Continued)

element which is arranged between the sealing surfaces in the blocking state and which completely stretches over one of the sealing surfaces.

20 Claims, 4 Drawing Sheets

(52) U.S. Cl.
CPC .......... *F16K 1/2014* (2013.01); *F16K 1/2085* (2013.01); *F16K 1/2092* (2013.01); *F16K 25/02* (2013.01)

(56) References Cited

U.S. PATENT DOCUMENTS

| | | | | |
|---|---|---|---|---|
| 1,899,154 | A * | 2/1933 | Karrick | F16K 1/2014 137/242 |
| 1,913,027 | A | 6/1933 | Griffith | |
| 2,352,996 | A | 7/1944 | Rider | |
| 2,377,947 | A * | 6/1945 | Lewis | 137/511 |
| 2,398,461 | A * | 4/1946 | Rider | 169/19 |
| 2,469,831 | A * | 5/1949 | Lewis | F16K 1/2007 169/19 |
| 2,534,942 | A | 12/1950 | Clement | |
| 2,644,479 | A * | 7/1953 | Rowley | F16K 1/205 137/312 |
| 2,667,934 | A | 2/1954 | Rowley | |
| 3,307,633 | A | 3/1967 | Newall | |
| 4,190,074 | A * | 2/1980 | Mailliet | F16K 1/2057 137/315.16 |
| 4,561,630 | A * | 12/1985 | McCulloch | A62C 35/02 137/527.4 |
| 4,854,342 | A * | 8/1989 | Polan | A62C 35/68 137/516.29 |
| 5,295,503 | A * | 3/1994 | Meyer | A62C 35/58 137/552 |
| 5,620,017 | A | 4/1997 | Yamada | |
| 7,240,740 | B2 * | 7/2007 | Reilly | F16K 31/126 137/488 |
| 9,072,924 | B2 * | 7/2015 | Capsius | A62C 35/64 |
| 10,441,833 | B2 * | 10/2019 | Pohl | F16K 15/033 |
| 2017/0037975 | A1 | 2/2017 | Weingarten | |
| 2018/0361184 | A1 * | 12/2018 | Pohl | A62C 37/36 |

FOREIGN PATENT DOCUMENTS

| | | |
|---|---|---|
| DE | 32 30 086 A1 | 2/1984 |
| DE | 195 17 214 A1 | 11/1996 |
| DE | 10 2008 051 956 | 9/2015 |
| EP | 0 348 217 A2 | 12/1989 |
| WO | WO 2017/087223 A1 | 5/2017 |

OTHER PUBLICATIONS

International Searching Authority, Written Opinion in German & English translation in International Appln. No. PCT/EP2018/052577, dated May 15, 2018, 15 pages.

* cited by examiner

VALVE AND USE THEREOF IN A FIRE-EXTINGUISHING SYSTEM

PRIORITY CLAIM AND INCORPORATION BY REFERENCE

This application is a 35 U.S.C. § 371 application of International Application No. PCT/EP2018/052577, filed Feb. 1, 2018, which claims the benefit of German Application No. 10 2017 102 425.5 filed Feb. 8, 2017, each of which is incorporated by reference in its entirety.

TECHNICAL FIELD

The present invention relates to a valve having a valve housing which has a fluid inlet chamber and a fluid outlet chamber, having a valve seat which is arranged between the fluid inlet chamber and the fluid outlet chamber, and having a closure body which is movable back and forth between a release position and a blocking position, wherein the closure body abuts against the valve seat in a fluid-tight manner in the blocking position, and wherein the fluid inlet chamber and the fluid outlet chamber are connected to one another in a fluid-conducting manner in the release position.

BACKGROUND AND SUMMARY OF THE INVENTION

Valves of the aforementioned type are used in all industrial sectors where the intention is for the fluid flow in flow lines to be interrupted, or released, in a controlled manner. A selected example for the use of the valves mentioned in the introduction is the use in fire-extinguishing systems. In fire-extinguishing systems, use is made inter alia of alarm valves, for example wet alarm or dry alarm valves, for holding back an extinguishing agent in the standby state and, after detection of a predetermined trigger event, for example a fire, releasing the fluid flow through the valve in order to combat the threat. According to the invention, other usage purposes are however also met.

A particular challenge in the construction of valves of the type mentioned in the introduction lies in reliable opening and closing behavior of the closure body on the valve seat. The closure body has to be reliably seated in a fluid-tight manner on the valve seat in the blocking position and must not become misaligned. The transition from the blocking state to the release state, and if appropriate back again, has to function reliably.

In practice, it is furthermore to be noted that the mounting of the closure body in the valve often requires special attention and thus an associated increase in mounting effort. There is particular emphasis here on the need for positioning the closure body exactly relative to the valve seat, in order that the fluid-tight abutment can be ensured.

In alarm valves for fire-extinguishing systems, for ensuring misalignment-free and sealed abutment of the closure body on the valve seat for example, a mechanism which arranges the closure body at the valve not in an exclusively pivotable manner but additionally allows a slight axial and/or radial movement of the closure body relative to the valve seat was selected in the prior art in order that a seating of the closure body on the valve seat that is optimized with regard to the respective mounting situation and any production tolerances could be set by the fitter. However, this had the effect that, after a single use, the position of the closure body had to be finely adjusted again with a great deal of manual effort in order that renewed fluid-tight closure became possible.

The invention was consequently based on the object of specifying, for valves in general and for alarm valves for fire-extinguishing systems in particular, a possibility which substantially overcomes the aforementioned disadvantages as far as possible. The invention was based in particular on the object of specifying a valve which is simple to mount and which allows fluid-tight blocking of the fluid flow in a reliable and repeatable manner.

The invention achieves the object on which it is based, in the case of a valve of the type mentioned in the introduction, in that the valve seat and the closure body each have a sealing surface, which are opposite one another in the blocking state, and an elastically deformable sealing element which is arranged between the sealing surfaces in the blocking state and which completely stretches over one of the sealing surfaces. According to the invention, "under-stretching" is to be understood as meaning that the sealing element stretches over the entire sealing surface and is preferably in close abutment therewith, for example is under elastic tension. The invention follows the realization that, in the prior art, the required movability of the closure body beyond pure pivotability was brought about by the type of the sealing means. In this regard, in the prior art, use has hitherto been made, for example in the area of alarm valves of fire-extinguishing systems, of axially acting or radially acting sealing elements, which accordingly have to be precisely positioned relative to the valve seat either in an axial or a radial direction in order to ensure sealing and prevent misalignment of the closure body during the opening. The fact that, according to the invention, a sealing element which stretches over the entire sealing surface is selected means that sealing material is also available on the entire sealing surface, which weakens the positional dependency of the two sealing surfaces with respect to one another. If the sealing element is biased against on the sealing surface, the elasticity of the sealing material itself promotes captive retention of the sealing material on the sealing surface. The invention also makes it possible for the sealing element to be selected for example from an annular sealing strip which has a hollow-cylindrical shape and which, when deformed elastically, can come to bear snugly against the geometry of the sealing surface.

The sealing element according to the invention is at any rate superior to conventional sealing rings (for example O-rings) or flat seals.

Preferably, at least one of the sealing surfaces is sectionally or completely of conically tapered form. Particularly preferably, both sealing surfaces are at least sectionally of conically tapered form.

The conical shape of the sealing surfaces results in radial centering of the closure body relative to the valve seat. In combination with the full-area attachment of the sealing element, sealing between the sealing surfaces is made possible even in the event of slight positional errors.

According to a preferred refinement of the invention, the sealing element is fastened to the closure body and the sealing surface provided on the closure body is that sealing surface which is completely stretched over.

In a further preferred embodiment, the closure body has a main body, which is mounted pivotably on the valve housing, and a valve disk, wherein the sealing element has a retaining section which is clamped between the main body and the valve disk. Preferably, the closure body is mounted on the valve housing so as to be exclusively pivotable and has no translational degrees of freedom. It is furthermore preferable if the retaining section of the sealing element is likewise formed to be elastically deformable, in particular elastically compressible, even when it is clamped between the main body and the valve disk. The valve disk is preferably reversibly detachably fastened to the closure body, this having an advantageous effect on the mounting. For the purpose of changing the sealing element, it is no longer necessary for the entire closure body to be removed. Rather, it is sufficient for the valve disk to be dismounted from the closure body, the sealing element to be pulled off from the valve disk and a new sealing element to be stretched on. Subsequently, renewed mounting and clamping can take place, and so maintenance intervals are able to be configured in a less cost-intensive and more time-effective manner.

The retaining section of the sealing element is preferably formed at a first face-side end of the sealing element, and the sealing element has a second face-side end which is opposite the first end and which abuts against the valve disk opposite the side of the retaining section. In other words, the sealing element wraps around the valve disk on both sides of the sealing surface, and in this way bears snugly against said valve disk such that the sealing element is secured against axial downward sliding from the valve disk and the full-area stretching over the sealing surface remains ensured.

In a further preferred embodiment, a preferably annularly encircling thickened part is formed on the retaining section of the sealing element. It is furthermore preferable if the closure body has a particularly preferably annularly encircling recess which more preferably corresponds to said thickened part and which interacts with the thickened part and into which the thickened part engages. In this way, the correct positioning of the sealing element relative to the valve disk is simplified, and a form-fitting captive connection is achieved. Moreover, in the clamped-in state, the thickened part can act as an additional seal.

In a preferred configuration, the recess is in the form of sub-recesses, which are formed both in the main body and in the valve disk.

In a particularly preferred embodiment of the valve, the main body has a mounting surface which faces the valve disk, and the valve disk is coupled pivotably to the main body such that the valve disk can be deflected through an angle value relative to the mounting surface. Preferably, the valve disk is screwed into the main body and has a passage bore which permits, relative to the fastening screw, movement play in a radial direction. Said movement play, in particular in conjunction with the elasticity of the sealing element at the retaining section thereof, allows the valve disk, in the event of oblique abutment on the valve seat, to perform, by a pivoting movement through the predetermined angle value, a compensation movement which, despite the erroneous positioning, brings about sealed abutment against the valve seat. For this purpose, only at the position which first comes into abutment with the valve seat does slightly stronger compression occur at the opposite end of the retaining section, whereby the valve disk is able to bear snugly against the valve seat. The value of the compensation angle is dependent on how thick the retaining section is and how large the movement play between the fastening screw and the passage bore in the preferred configuration is selected to be.

In a further preferred embodiment of the valve, the sealing surface of the closure body is connected in a fluid-conducting manner to the fluid inlet chamber by means of one or more flow channels. The flow channel(s) is/are consequently formed at the closure body so as to be open toward the fluid inlet chamber and extends/extend through the closure body to the sealing surface of the closure body. This has the following technical effect: A positive pressure prevailing in the fluid inlet chamber results in the transportation of fluid with a corresponding fluid pressure to the sealing surface via the flow channel(s). The fluid pushes against the sealing element from the side of the flow channel, and presses the sealing element against the corresponding sealing surface of the valve seat in a diaphragm- or balloon-like manner. If the closure body is moved out of the blocking position by a small amount, the sealing element expands as a result of the increasing gap between the opposite sealing surfaces and, owing to the fluid pressure communicated, is slightly lifted off from the sealing surface of the closure body. Thus, despite a starting movement of the closure body away from the valve seat, said sealing element continues to maintain at least a degree of the sealing action. This improves the sealing function of the valve significantly and also increases the positional tolerance of the closure body relative to the valve seat.

In a further preferred embodiment, formed on the sealing element in the region of the sealing surfaces, preferably on a side which faces the valve seat, are two or more encircling projections, which define a chamber which, in the blocking state, is sealed off in a fluid-free manner with respect to the fluid inlet chamber and the fluid outlet chamber.

It is furthermore preferable if the valve housing has an alarm channel, which is connected in a fluid-conducting manner to the chamber via one or more flow channels, and an alarm channel outlet for the connection of a preferably pneumatically or hydraulically driven alarm device. This embodiment explicitly relates to an alarm valve according to one particular aspect of the invention. In this embodiment, if the closure body is moved from the blocking position into a release position, the alarm channel is flooded and a corresponding control pressure can be transmitted to an alarm device, with for example a warning bell (water motor gong, "WMG") or a macrophone counting as an alarm device.

The alarm channel is preferably defined both by a wall of the valve seat and by a wall of the valve housing.

In a further preferred embodiment, the valve seat is reversibly detachably coupled to the valve housing, preferably screwed into the valve housing.

While the invention, according to a first aspect, has been described above substantially in relation to a valve in general, in a second aspect, the invention also relates to a valve which is designed according to one of the above-described preferred embodiments and which is designed as a valve of a fire-extinguishing system, in particular alarm valve of a fire-extinguishing system, and particularly preferably as a wet alarm or dry alarm valve of the fire-extinguishing system.

The alarm valve has the same advantages and preferred embodiments according to the invention as the above-described general valve.

The invention thus furthermore also relates to a use of the valve according to one of the above-described preferred embodiments as an alarm valve for a fire-extinguishing system, wherein, with regard to the advantages of the preferred embodiments, the above-elucidated one applies here too.

BRIEF DESCRIPTION OF THE DRAWINGS

The invention will be described in more detail below on the basis of a preferred exemplary embodiment with reference to the appended figures, in which.

MODE(S) FOR CARRYING OUT THE INVENTION

Figure 1:
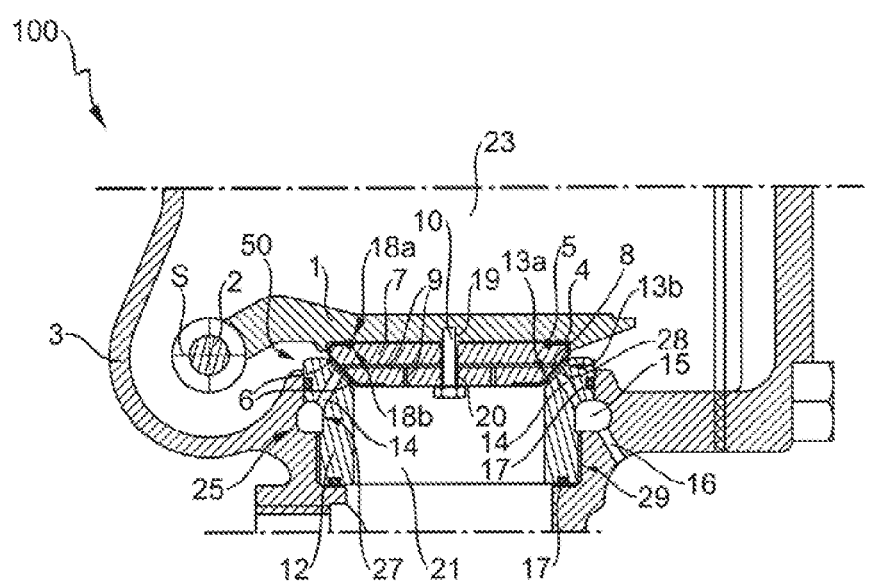
FIG. 1 shows a valve according to a preferred exemplary embodiment in a schematic, partially sectioned cross-sectional view, FIGS. 2 *a,b* show detail views of the valve according to FIG. 1.

FIG. 1 shows the basic construction of an alarm valve 100 which is constructed according to the principles of the present invention. The alarm valve 100 has a closure body 50 which is mounted so as to be exclusively pivotable about a pivot axis S and which is configured to release or to shut off the fluid flow from a fluid inlet chamber 21 into a fluid outlet chamber 23.

The closure body 50 has a main body 1 and is accommodated in a valve housing 3.

A sealing element 4 is fastened to the closure body 50. The sealing element 4 has a retaining section on which a thickened part 5 is formed. In the region of the retaining section and the thickened part 5, the sealing element 4 is clamped between the main body 1 of the closure body 50 and a valve disk 7. The sealing element 4 completely stretches over a sealing surface 13*a* of the valve disk 7 and is stretched onto the valve disk such that, at two face-side ends, of which one has the thickened part 5, it wraps around the valve disk on both sides of the sealing surface 13*a*.

In the blocking state shown in FIG. 1, the sealing surface 13*a* is opposite a sealing surface 13*b* of a valve seat 12, with the result that the sealing element 4 separates the fluid inlet chamber 21 from the fluid outlet chamber 23 by abutment on the two sealing surfaces 13*a,b*.

The valve seat 12 is preferably screwed into the valve housing 3 and sealed off relative to the valve housing 3 by means of corresponding sealing elements, for example O-rings 17.

The sealing element 4 has two annular projections 6, which are formed on a side of the sealing element 4 that faces the valve seat 12 and which define between them and the sealing surface 13*b* a chamber 28 separated in a fluid-tight manner from the fluid inlet chamber 21 and the fluid outlet chamber 23. On the other side, the sealing surface 13*a* of the valve disk 7 has a recess 8 into which one or more flow channels 9 open. The flow channels 9 are connected in a fluid-conducting manner to the fluid inlet chamber 21 such that a pressure prevailing in the fluid inlet chamber is propagated through the flow channels into the recess 8 and thus toward the sealing element 4. Further discussion will be made in this regard in particular with reference to FIGS. 3 and 4.

The valve disk 7 is fastened to the main body 1 by means of a retaining screw 10. Provided in the valve disk 7 is a passage bore 20, relative to which movement play is formed between the retaining screw 10 and the passage bore 20. This will be discussed further with reference to FIG. 2*b*. The fastening screw 10 is preferably retained in a thread 19 in the main body 1.

The sealing element 4 is clamped at its retaining section between the valve disk 7 and the main body 1.

One or more flow channels extend through the valve seat to an alarm channel 15 from the chamber 28 defined between the annular projections 6. The alarm channel is preferably relieved of pressure in the blocking position shown. If the closure body 50 is opened by pivoting about the axis S, the fluid entering through the fluid inlet chamber 21 floods the alarm channel 15 and, from there, optionally one or more external alarm lines which are connected in a fluid-conducting manner to a hydraulically or pneumatically operated alarm means. Furthermore, provision is optionally additionally made of a pressure compensation opening or an alarm channel outlet 16 in the valve housing 3.

Figure 2A:
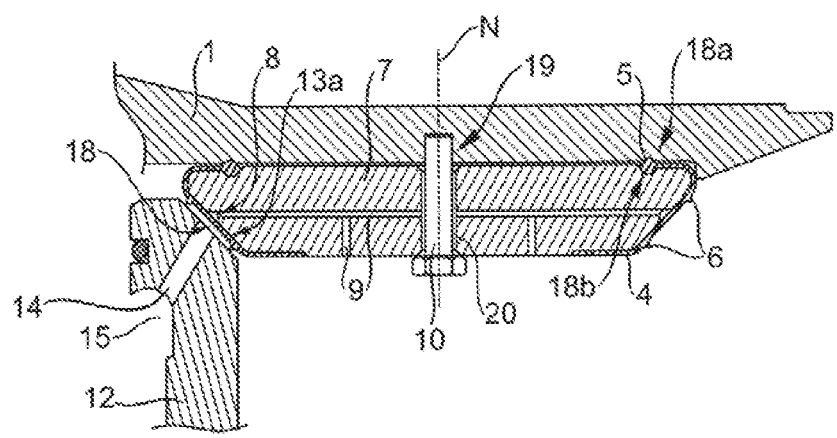
Figure 2B:
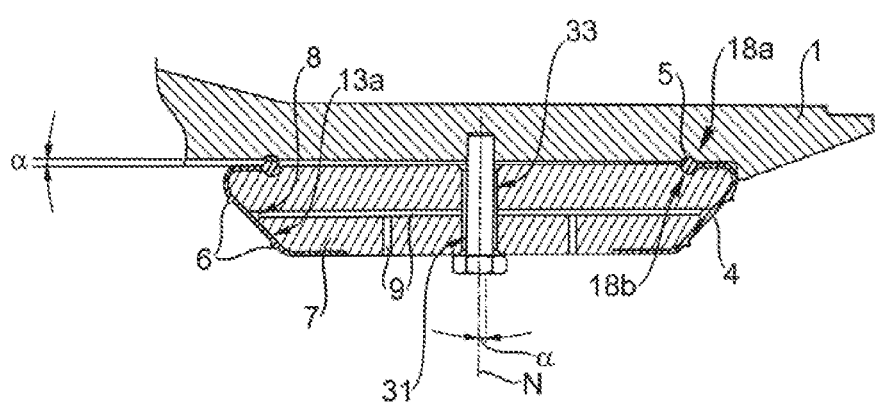

As is illustrated in more detail in FIGS. 2*a,b*, the valve disk 7 is movable relative to the main body 1. The valve disk 7 is arranged opposite a mounting surface 22 of the main body 1 and is oriented in the direction of a surface normal N according to FIG. 2*a*. In the state shown, the sealing element 4 is arranged with its thickened part in a corresponding recess 18*a,b*, which is formed partially in the main body 1 and partially in the valve disk 7. The sealing element 4 has, in particular in the clamped region, an elastic shape-changing capability such that, in the present of a pressure loading outside the axis of the surface normal N, a deflection through an angle α occurs (see FIG. 2*b*). Such off-center loading occurs for example if the valve disk 7 comes into abutment with the valve seat 12 and the sealing surface 13*b* thereof with a slight positional error. By means of the movement play between an outer circumference 33 of the retaining screw 10 and an inner circumference 31 of the passage bore 20, in addition to the parameters of the deformability of the sealing element 4, the maximum possible angle α is determined.

Figure 3:
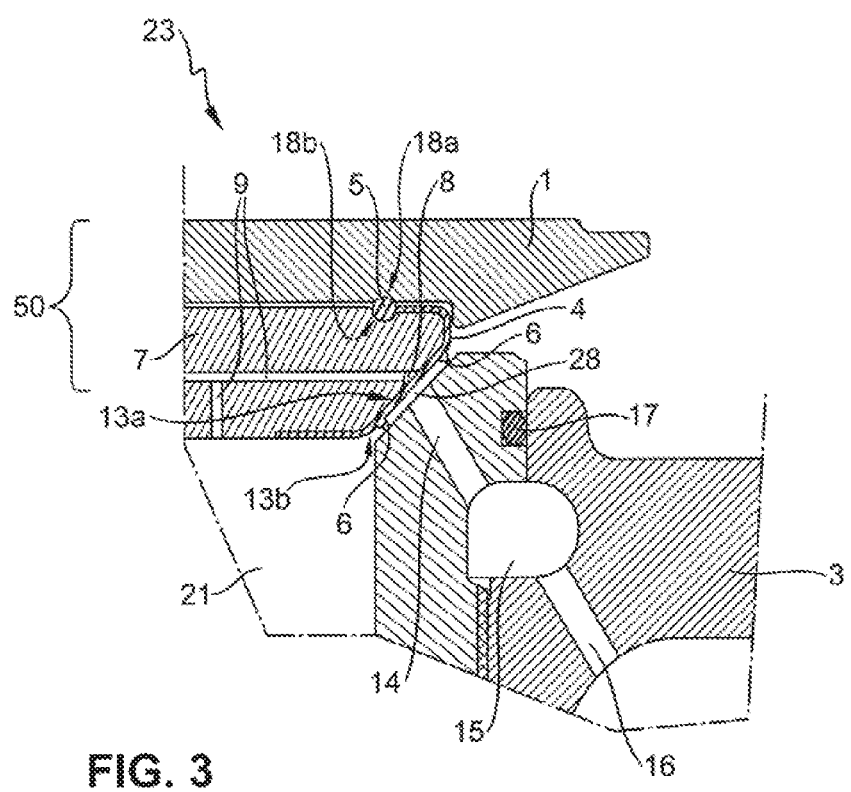
FIG. 3 shows a further detail view of the exemplary embodiment according to FIGS. 1 and 2*a-b*.
Figure 4:
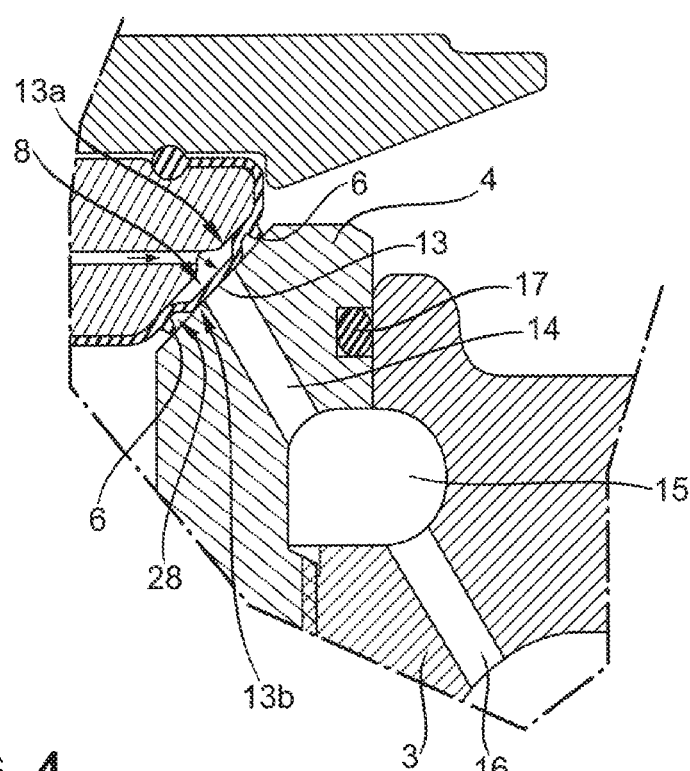
FIG. 4 shows the detail view according to FIG. 3 in an alternative operating state.

With light having been shed in FIGS. 2*a,b* primarily on the compensation capability of the valve disk 7, in FIGS. 3 and 4, attention is directed in particular toward the compensation capability of the sealing element 4 itself. FIG. 3 illustrates a state in which the fluid inlet chamber 21 of the valve 100 is substantially relieved of pressure. In this state, the sealing element 4 is in close abutment with the first sealing surface 13*a*, and the chamber 28 defined between the annular projections 6 and the second sealing surface 13*b* has a particular volume.

As soon as a positive pressure prevails in the fluid inlet chamber 21, a corresponding positive pressure is built up directly adjacent to the sealing element 4 in the recess 8 via the flow channels 9. Since, at its face-side end sections, the sealing element 4 is seated fixedly on the valve disk of the closure body 50, the sealing element bulges as a result of the positive pressure such that it is lifted off from the sealing surface 13*a* and is pressed against the sealing surface 13*b* (see FIG. 4 and the arrows indicating this action). The volume in the chamber 28 collapses. If then the closure body 50 is slightly pivoted, and an increase of the spacing between the first and second sealing surfaces 13*a,b* occurs, the shape, inflated in this manner, of the sealing element 4 can, at least for a particular path length, continue to maintain the pressure tightness and delay the flooding of the alarm channel 15, which reduces additional safeguarding with respect to possible false alarms in the event of brief pressure pulses in the fluid inlet chamber 21. Moreover, the positional tolerance between the valve disk 7 and the valve seat 12 is further increased.

As emerges from the above elucidations, the valve according to the invention provides a significant improvement with regard to the closing and mounting behavior in comparison with the known prior art. Aside from the field of application, shown here by way of example, of an alarm valve, the valve is able to be used in a versatile manner in other areas of machine and plant construction too. As a result of the reversibly detachable connection between the valve disk 7 and the main body 1 of the closure body 50, rapid and cost-effective replacement of the sealing element 4 is possible at all times, just like for example matching of the material of the sealing element 4 to the respectively conveyed medium in dependence on the aggressiveness thereof, etc. The movement play between the valve disk 7 and the main body 1 ensures, together with the properties of the sealing element 4 itself, universal usability for the conveyance of gas or liquids and also particle-containing media.

LIST OF UTILIZED REFERENCE NUMBERS

1 Main body
2 Pin
3 Valve housing
4 Sealing element
5 Thickened part
6 Annular projection
7 Valve disk
8 Recess (sealing surface)
9 Flow channel (valve disk)
10 Retaining screw
12 Valve seat
13a Sealing surface (valve disk)
13b Sealing surface (valve seat)
14 Flow channel (valve seat)
15 Alarm channel
16 Alarm channel outlet
17 O-ring
18a,b Recess (valve body)
19 Thread (main body)
20 Passage bore (valve disk)
21 Extinguishing-fluid inlet chamber
22 Mounting surface (main body)
23 Extinguishing-fluid outlet chamber
25 Wall (valve housing)
27 Wall (valve seat)
28 Chamber
29 Thread (valve seat)
31 Inner circumference (passage bore)
33 Outer circumference (retaining screw)
50 Valve body
100 Fire-extinguishing system valve
α Angle (valve disk)
N Surface normal
S Pivot axis (valve body)

The invention claimed is:

1. A valve comprising:
a valve housing which has a fluid inlet chamber and a fluid outlet chamber,
a valve seat which is arranged between the fluid inlet chamber and the fluid outlet chamber, and
a closure body which is movable back and forth between a release position and a blocking position, wherein the closure body abuts against the valve seat in a fluid-tight manner in the blocking position, and wherein the fluid inlet chamber and the fluid outlet chamber are connected to one another in a fluid-conducting manner in the release position,
wherein the valve seat and the closure body each have a sealing surface, which are opposite one another in the blocking state, and an elastically deformable sealing element which is arranged between the sealing surfaces in the blocking state and which completely stretches over one of the sealing surfaces;
wherein formed on the sealing element in the region of the sealing surfaces, on a side which faces the valve seat, are two or more encircling projections, which define a chamber which, in the blocking state, is sealed off in a fluid-free manner;
wherein the sealing surface of the closure body is connected in a fluid-conducting manner to the fluid inlet chamber by one or more flow channels; and
wherein the sealing element bulges into the chamber between the two or more encircling projections upon positive pressure within the fluid inlet chamber.

2. The valve as claimed in claim 1, wherein at least one of the sealing surfaces is of conically tapered form.

3. The valve as claimed in claim 1, wherein the sealing element is fastened to the closure body and completely stretches over the sealing surface provided on the closure body.

4. The valve as claimed in claim 1, wherein the closure body has a main body, which is mounted pivotably on the valve housing, and a valve disk, wherein the sealing element has a retaining section which is clamped between the main body and the valve disk.

5. The valve as claimed in claim 4, wherein the retaining section is formed at a first face-side end of the sealing element, and the sealing element has a second face-side end which is opposite the first end and which abuts against the valve disk opposite the side of the retaining section.

6. The valve as claimed in claim 1, wherein the valve seat is reversibly detachably coupled to the valve housing.

7. An alarm valve for a fire-extinguishing system, wherein the valve is designed as claimed in claim 1.

8. The valve as claimed in claim 1, wherein the main body has a mounting surface which faces the valve disk, and the valve disk is coupled pivotably to the main body such that the valve disk can be deflected through an angle value relative to the mounting surface.

9. A valve, comprising:
a valve housing which has a fluid inlet chamber and a fluid outlet chamber,
a valve seat which is arranged between the fluid inlet chamber and the fluid outlet chamber, and a closure body which is movable back and forth between a release position and a blocking position,
wherein the closure body abuts against the valve seat in a fluid-tight manner in the blocking position, and wherein the fluid inlet chamber and the fluid outlet chamber are connected to one another in a fluid-conducting manner in the release position,
wherein the valve seat and the closure body each have a sealing surface, which are opposite one another in the blocking state, and
an elastically deformable sealing element which is arranged between the sealing surfaces in the blocking state and which completely stretches over one of the sealing surfaces,
wherein the closure body has a main body, which is mounted pivotably on the valve housing, and a valve disk, wherein the sealing element has a retaining section which is clamped between the main body and the valve disk, and
wherein an annularly encircling thickened part is formed on the retaining section.

10. The valve as claimed in claim 9, wherein the closure body has an annularly encircling recess which interacts with the thickened part and into which the thickened part engages.

11. The valve as claimed in claim 10, wherein the recess is in the form of sub-recesses, which are formed both in the main body and in the valve disk.

12. The valve as claimed in claim 9, wherein the sealing surface of the closure body is connected in a fluid-conducting manner to the fluid inlet chamber by one or more flow channels.

13. The valve as claimed in claim 9, wherein formed on the sealing element in the region of the sealing surfaces, on a side which faces the valve seat, are two or more encircling projections, which define a chamber which, in the blocking state, is sealed off in a fluid-free manner.

14. The valve as claimed in claim 13, wherein the valve is a wet or dry alarm valve for a fire-extinguishing system, and wherein the valve housing has an alarm channel, which is connected in a fluid-conducting manner to the chamber via one or more flow channels, and an alarm channel outlet for the connection of a pneumatically or hydraulically driven alarm device.

15. The valve as claimed in claim 14, wherein the alarm channel is defined both by a wall of the valve seat and by a wall of the valve housing.

16. A valve, comprising:
a valve housing which has a fluid inlet chamber and a fluid outlet chamber,
a valve seat which is arranged between the fluid inlet chamber and the fluid outlet chamber, and a closure body which is movable back and forth between a release position and a blocking position,
wherein the closure body abuts against the valve seat in a fluid-tight manner in the blocking position, and wherein the fluid inlet chamber and the fluid outlet chamber are connected to one another in a fluid-conducting manner in the release position,
wherein the valve seat and the closure body each have a sealing surface, which are opposite one another in the blocking state, and
an elastically deformable sealing element which is arranged between the sealing surfaces in the blocking state and which completely stretches over one of the sealing surfaces,
wherein the closure body has a main body, which is mounted pivotably on the valve housing, and a valve disk, wherein the sealing element has a retaining section which is clamped between the main body and the valve disk, and
wherein the main body has a mounting surface which faces the valve disk, and the valve disk is coupled pivotably to the main body such that the valve disk can be deflected through an angle value relative to the mounting surface.

17. The valve as claimed in claim 16, wherein the sealing surface of the closure body is connected in a fluid-conducting manner to the fluid inlet chamber by one or more flow channels.

18. The valve as claimed in claim 16, wherein formed on the sealing element in the region of the sealing surfaces, on a side which faces the valve seat, are two or more encircling projections, which define a chamber which, in the blocking state, is sealed off in a fluid-free manner.

19. The valve as claimed in claim 16, wherein the retaining section is formed at a first face-side end of the sealing element, and the sealing element has a second face-side end which is opposite the first end and which abuts against the valve disk opposite the side of the retaining section.

20. The valve as claimed in claim 19, wherein an annularly encircling thickened part is formed on the retaining section.

* * * * *